3,594,157
ALKALINE CHLORINATION OF WASTE PHOTOGRAPHIC PROCESSING SOLUTIONS CONTAINING SILVER
Thomas N. Hendrickson and Thomas J. Dagon, Rochester, N.Y., assignors to Eastman Kodak Company, Rochester, N.Y.
No Drawing. Filed Aug. 19, 1969, Ser. No. 851,464
Int. Cl. C22b *11/06*
U.S. Cl. 75—112    7 Claims

ABSTRACT OF THE DISCLOSURE

Waste photographic processing solutions which contain silver thiosulfate complex, such as exhausted thiosulfate fixing solutions, are chlorinated under alkaline conditions to precipitate a silver-bearing sludge from which the silver can be separated and to destroy thiosulfate ion and thereby reduce the oxygen demand of the solution. Chlorination can be effected by introduction of chlorine gas or by use of hypochlorite solution. Since thiosulfate ion accounts for a major part of the oxygen-consuming material which is discharged in photographic processing, a significant source of water pollution is substantially eliminated by this method.

---

This invention relates in general to the photographic art and in particular to the treatment of waste photographic processing solutions. More specifically, this invention relates to treating waste photographic processing solutions which contain silver thiosulfate complex, such as exhausted thiosulfate fixing solutions, to recover the silver and to convert the thiosulfate ions to innocuous reaction products so as to reduce water pollution resulting from disposal of the waste solution.

Silver recovery from photographic processing solutions is a highly developed art and many different methods of accomplishing such recovery have been proposed over the years. Although silver is sometimes recovered from bleach baths and wash solutions, the most important source of recoverable silver in photographic processing is the fixing bath. Since the most commonly used fixing agents are ammonium or alkali metal thiosulfates and these compounds react in such manner that the silver becomes part of a negatively charged silver thiosulfate complex, recovery of silver typically involves treatment of a solution containing silver thiosulfate complex. Depending on the method of silver recovery utilized, the fixing solution may or may not be suitable for subsequent reuse.

All of the commercially important methods for recovery of silver from photographic fixing solutions can be grouped into one of three classes, namely, precipitation of the silver by addition of chemical agents, metallic replacement in which the solution is brought into contact with a metal which replaces the dissolved silver, and electrolytic recovery in which the silver is plated out on the cathode of an electrolytic cell. Reuse of the fixing solution is feasible under most circumstances only with electrolytic recovery so that use of either chemical precipitation or metallic replacement requires that the solution be disposed of after treatment and, thus, involves the disposal of a solution containing a high concentration of thiosulfate ions. This disposal presents a serious pollution problem in view of the fact that in large scale processing installations the volume of fixing solution to be discarded can be very large and further in view of the fact that the thiosulfate ion which is present in the solution following recovery of the silver is a major pollutant because of its high oxygen demand.

In accordance with this invention, photographic processing solutions which contain silver thiosulfate complex are treated by a method which permits efficient recovery of the silver and at the same time reduces the oxygen demand of the solution by converting thiosulfate ion to innocuous oxidation products. The method comprises chlorination of the solution under alkaline conditions. Such chlorination serves to precipitate a silver-bearing sludge from which the silver can be readily separated and also destroys the thiosulfate ions so that water pollution resulting from disposal of the solution after treatment is minimized.

An exhausted thiosulfate fixing solution is a relatively complicated solution which typically contains, in addition to thiosulfate ion and the silver thiosulfate complex materials such as alkali metal sulfites, alkali metal carbonates, chelating agents, gelatin hardening agents, acids, halides, gelatin, and so forth. In some instances, the exhausted fix may contain developer and/or developer oxidation products which are present as a result of carry-in from the developer solution, while in certain processes hexacyanoferrate ions may be present in the exhausted fix as a result of carry-in from bleach solutions. Even more complicated waste solutions may be formed when different effluents from the photographic processing system are combined together before disposal, e.g. combined ferricyanide bleach and thiosulfate fix overflows, and it is inteneded by use of the term "waste photographic processing solution" to include all such compositions. Regardless of the exact make-up of the waste solution, as a result of reaction between silver ion and thiosulfate ion the silver will have become part of a negatively charged silver thiosulfate radical and, as employed herein, the term "silver thiosulfate complex" is intended to mean all silver thiosulfate compounds comprising such radicals which may be present in the waste solution, e.g. sodium silver thiosulfate compounds such as $NaAgS_2O_3$ or $Na_4Ag(S_2O_3)_3$ or potassium silver thiosulfate compounds such as $KAgS_2O_3$ or $K_4Ag(S_2O_3)_3$.

While applicants do not wish to be bound by any theoretical explanation for the manner in which their invention functions, it is postulated that upon introduction of chlorine under alkaline conditions formation of hypochlorite ion occurs and a localized acidity is produced which causes the breakdown of thiosulfate ion to form sulfur which in turn brings about precipitation of silver sulfide. The reactions can be illustrated as follows:

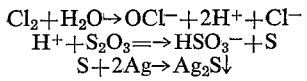

$$Cl_2 + H_2O \rightarrow OCl^- + 2H^+ + Cl^-$$
$$H^+ + S_2O_3^= \rightarrow HSO_3^- + S$$
$$S + 2Ag \rightarrow Ag_2S\downarrow$$

Other reactions leading to formation of silver sulfide may also occur, e.g. the following reactions:

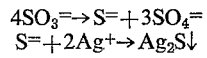

$$4SO_3^= \rightarrow S^= + 3SO_4^=$$
$$S^= + 2Ag^+ \rightarrow Ag_2S\downarrow$$

It is probable that several concurrent reactions are involved. In addition to precipitation of silver as silver sulfide, oxidation of thiosulfate ion to sulfate ion occurs, with the overall reaction being represented by the following equation:

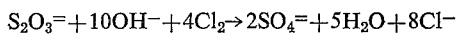

$$S_2O_3^= + 10OH^- + 4Cl_2 \rightarrow 2SO_4^= + 5H_2O + 8Cl^-$$

This reaction consumes hydroxyl ion and, accordingly, the kinetics are strongly pH-dependent. Some thiosulfate is believed to be converted to an intermediate oxidation state, probably the tetrathionate, before oxidation to sulfate. Complete oxidation of thiosulfate ion to sulfate ion will, of course, reduce to zero that portion of the total oxygen demand which is attributable to thiosulfate. Since thiosulfate is a major source of total oxygen demand with photographic processing wastes, chlorination under alkaline conditions in accordance with this invention greatly reduces the pollution caused by discharging the treated waste to the sewage system.

As previously indicated, the method of this invention is not limited to treatment of exhausted fixing solution but is applicable to any photographic processing solution containing silver thiosulfate complex. Thus, it may be used on combined processing effluents, i.e. effluents formed by combining overflows from fixing baths, bleach baths, stop baths, wash tanks, and the like. The silver content of the waste solution may vary over a wide range, the method providing satisfactory results with solutions containing as little as about 0.1 grams per liter of silver, or less, to as much as about 10 grams per liter, or more. In those instances where hexacyanoferrate ion from bleach solution is present in the waste solution, use of alkaline chlorination provides the further advantage that the hexacyanoferrate ion is also converted to innocuous products. Thus, if waste processing solutions containing hexacyanoferrate ions are discharged to the sewer without treatment, these ions will be slowly oxidized in the presence of ultraviolet radiation to cyanide ions, which are probably the most toxic to fish and other aquatic life of any of the chemicals discharged from photographic processes. However, alkaline chlorination results in conversion of hexacyanoferrate ions to cyanate in accordance with the following equation:

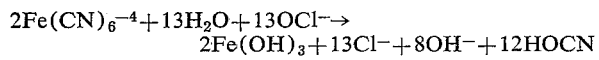

$$2Fe(CN)_6^{-4} + 13H_2O + 13OCl^- \rightarrow$$
$$2Fe(OH)_3 + 13Cl^- + 8OH^- + 12HOCN$$

The cyanate formed is only about one thousandth as toxic to fish and other aquatic life as cyanide and is further oxidized by natural processes to inert end products of carbon and nitrogen.

While it has been known for many years that silver can be successfully recovered from exhausted fixing baths by precipitation as silver sulfide, the most widely used method for effecting such precipitation has been the addition of sodium sulfide to the solution (see, for example, the article "Silver Recovery From Exhausted Fixing Bath" by J. I. Crabtree and J. F. Ross, Trans. S.M.P.E., November 1926). In treating an exhausted sodium thiosulfate fix by this method the reaction involved may be represented as follows:

$$Na_2S + 2NaAgS_2O_3 \rightarrow Ag_2S + 2Na_2S_2O_3$$

While this is a highly efficient method of recovering silver, the solution remaining after removal of the silver sulfide contains thiosulfate ions and, thus, the pollution resulting from disposal of the exhausted fix is not significantly reduced. The method of this invention, i.e. alkaline chlorination, unexpectedly brings about the precipitation of silver sulfide and, thus, is an equally effective method of recovering silver. In addition, it also provides the important advantage that it brings about a substantial reduction in the oxygen demand of the solution so that pollution problems are greatly reduced.

Alkaline chlorination of waste photographic processing solutions can be carried out using batch, semi-continuous or continuous techniques. A suitable procedure is to bubble chlorine gas into the solution while adding sodium hydroxide to the solution to maintain the desired alkaline pH. The amount of chlorine gas used will depend upon the concentration of thiosulfate ion in the solution, the efficiency of the contacting procedure utilized, the extent to which residual thiosulfate ion in the treated solution can be tolerated, and so forth. Thus, the amount of chlorine used may vary from as little as about 1 to as much as about 100 volumes of chlorine gas per volume of solution, and this amount of chlorine can be provided by any combination of flow rate and time which will permit adequate contact between the solution and the chlorine. Precipitation of the silver will ordinarily be completed quite quickly, i.e. in the early stages of chlorination, but continued chlorination after precipitation is complete may be necessary to reduce the thiosulfate ion concentration to the desired low level. Oxidation of hexacyanoferrate ion does not begin until substantially all of the thiosulfate ion has been oxidized so that longer chlorination times are needed if it is desired to substantially reduce the concentration of this ion in a waste solution.

Instead of effecting chlorination by introducing chlorine gas into the waste processing solution, it may be accomplished by adding hypochlorite solution. Results are essentially the same since the introduction of chlorine gas into an alkaline solution results in the formation of hypochlorite, an example of the reaction being as follows:

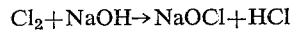

$$Cl_2 + NaOH \rightarrow NaOCl + HCl$$

An advantage in employing the hypochlorite solution is that it is less hazardous to use. It also tends to give a faster and more efficient reaction with thiosulfate ion.

Whether chlorination is accomplished by the use of chlorine gas or by the use of hypochlorite solution, it is carried out in accordance with this invention under alkaline conditions. The required alkaline pH is most easily provided by the addition of a strong base to the solution, e.g. sodium hydroxide or potassium hydroxide, but any other suitable means of maintaining an alkaline pH known to the art may be employed. The strong base is preferably added approximately simultaneously with the addition of the chlorine. While the method is operable at any alkaline pH, it proceeds most rapidly and efficiently at a high pH. It is, thus, preferred to carry out the chlorination with the solution at a pH of greater than 10 and more preferably of 11.5 or more.

The silver-bearing sludge formed by alkaline chlorination of waste photographic processing solutions in accordance with this invention may contain silver halide, metallic silver, sulfur, gelatin, and other materials, in addition to the silver sulfide. It may be separated from the solution by any suitable procedure such as by decantation, filtration or centrifugation, and the silver can then be separated from the sludge and purified by conventional procedures well known in the photographic art. Thus, for example, the silver can be recovered by smelting the silver-bearing sludge, casting the resulting crude silver into anodes, and electrolytically purifying to give high purity silver.

The invention is further illustrated by the following examples of its practice. In considering the data presented, it should be noted that a reduction of one gram in concentration of thiosulfate ion is equivalent to a reduction of 0.442 gram of BOD (biological oxygen demand) or 0.553 gram of COD (chemical oxygen demand).

EXAMPLE 1

A thiosulfate fix consisting of an aqueous solution of the following composition:

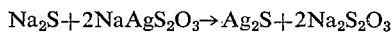

| | |
|---|---|
| Sodium thiosulfate pentahydrate _____gms./liter__ | 166 |
| Sodium carbonate _____gms./liter__ | 28 |
| Sodium bicarbonate _____gms./liter__ | 22 |
| Sodium sulfite _____gms./liter__ | 4.1 |
| Sodium hexametaphosphate _____gms./liter__ | 1.7 |
| Formaldehyde (37% solution) _____ml./liter__ | 33.2 | was used in processing silver halide photographic film until the silver concentration in the solution was 0.44 gram per liter. Two liters of the spent solution were subjected to alkaline chlorination by bubbling chlorine gas into the solution through a medium-porosity polyethylene gas-dispersion tube at a rate of 0.61 liters per minute for a period of 120 minutes while maintaining the pH at 11.5 by addition of 10 N NaOH. A precipitate containing silver sulfide formed and was separated from the solution by filtration. As compared with an initial thiosulfate concentration in the spent solution of 151 grams per liter and an initial COD of 53,500 milligrams per liter, after 120 minutes of chlorination the thiosulfate concentration was 12 grams per liter and the COD was 19,500 milligrams per liter. The concentration of silver in the solution was reduced by the chlorination from 0.44 to 0.01 grams per liter during the first five minutes of chlorination.

EXAMPLE 2

A thiosulfate fix consisting of an aqueous solution of the following composition:

| | Gms./liter |
|---|---|
| Sodium thiosulfate pentahydrate | 220 |
| Sodium sulfite | 10 |
| Sodium hydroxide | 0.55 | was used in processing silver halide photographic film until the silver concentration in the solution was 2.75 grams per liter. The spent solution had a concentration of hexacyanoferrate ion of 16 grams per liter as a result of carry-in from the bleach solution used in the process. Two liters of the spent solution were subjected to alkaline chlorination by bubbling chlorine gas into the solution at a rate of 1 liter per minute for a period of 140 minutes while maintaining the pH at 11.5 by addition of 10 N NaOH and as a result of the chlorination a precipitate containing silver sulfide was formed. As compared with an initial thiosulfate concentration in the spent solution of 183 grams per liter and an initial COD of 60,000 milligrams per liter, after 140 minutes of chlorination the thiosulfate concentration was zero and the COD was 16,500 milligrams per liter. The concentration of hexacyanoferrate ion was reduced by the chlorination from 16 to 10 grams per liter while the concentration of silver in the solution was reduced from 2.75 to 0.004 grams per liter.

EXAMPLE 3

The thiosulfate fix described in Example 2 was used in processing silver halide photographic film in a process which also utilized an aqueous bleach solution of the following composition:

| | Gms./liter |
|---|---|
| Sodium ferricyanide | 140 |
| Sodium ferrocyanide decahydrate | 5 |
| Sodium bromide | 40 |
| Polyethylene glycol (mol. wt.=approx. 1500) | 3 |
| Sodium borate pentahydrate | 1 |

Two liters of a mixture of one part by volume of the spent fix to one part by volume of the spent bleach were subjected to alkaline chlorination. This mixture had a concentration of silver of 0.6 grams per liter, a concentration of thiosulfate of 77 grams per liter, and a concentration of hexacyanoferrate ion of 81 grams per liter. The chlorination was effected by bubbling chlorine gas into the solution at a rate of 1 liter per minute for a period of 75 minutes while maintaining the pH at 11.5 by addition of 10 N NaOH. As compared with an initial thiosulfate concentration of 77 grams per liter and an initial COD of 51,000 milligrams per liter, after 75 minutes of chlorination the thiosulfate concentration was zero and the COD was 19,000 milligrams per liter. The concentration of hexacyanoferrate ion was reduced by the chlorination from 81 to 70 grams per liter while the concentration of silver in the solution was reduced from 0.6 grams per liter to less than 0.05 grams per liter.

EXAMPLE 4

Two different fix solutions and a bleach utilized in photographic processing were combined and the resulting mixture was treated by the method of this invention. The formulations of the fresh solutions were as follows:

Fix 1.—An aqueous solution of the following composition:

| | |
|---|---|
| Glacial acetic acid milliliters/liter | 16.3 |
| Sodium bisulfite gms./liter | 13.5 |
| Sodium acetate do | 13.5 |
| Ammonium thiosulfate (58% solution) milliliters/liter | 27 |
| Aluminum sulfate gms./liter | 8 |

Fix 2.—An aqueous solution of the following composition:

| | |
|---|---|
| Sodium thiosulfate pentahydrate gms./liter | 110.6 |
| Sodium carbonate monohydrate do | 22.1 |
| Sodium bicarbonate do | 14.6 |
| Sodium sulfite do | 2.8 |
| Formaldehyde (37% solution) milliliters/liter | 22.1 |
| Sodium hexametaphosphate gms./liter | 1.1 |

Bleach.—An aqueous solution of the following composition:

| | Gms./liter |
|---|---|
| Sodium nitrate | 28.4 |
| Potassium ferricyanide | 16.8 |
| Potassium bromide | 5.4 |
| Boric acid | 5.4 |
| Sodium borate pentahydrate | 3.4 |

The spent solutions were combined in a volume ratio of one part of Fix 1, one part of Fix 2, and one part of bleach, and the resulting solution had a silver concentration of 0.46 grams per liter and a concentration of thiosulfate of 41 grams per liter. Two liters of this solution were subjected to alkaline chlorination by bubbling chlorine gas into the solution at a rate of 0.32 liters per minute for a period of 180 minutes while maintaining the pH at 11.5 by addition of 10 N NaOH. As compared with an initial thiosulfate concentration of 41 grams per liter and an initial COD of 31,000 milligrams per liter, after 180 minutes of chlorination the thiosulfate concentration was zero and the COD was 17,000 milligrams per liter. The concentration of silver in the solution was reduced by the chlorination from 0.46 to 0.048 grams per liter.

EXAMPLE 5

A thiosulfate fix consisting of an aqueous solution of the following composition:

| | Gms./liter |
|---|---|
| Sodium thiosulfate pentahydrate | 204 |
| Sodium sulfite | 5 |
| Sodium bisulfite | 4.25 |
| Disodium hydrogen phosphate | 12.7 |
| Ethylenediaminetetraacetic acid | 2.0 | was used in processing silver halide photographic film and the spent solution was subjected to alkaline chlorination in a continuous process. To effect chlorination the solution was pumped by a metering pump from a storage tank into a baffled chlorination tank which was continuously supplied with 10 N NaOH in an amount sufficient to maintain the pH of the solution in the chlorination tank at about 11.5. Gaseous chlorine was fed from a cylinder into the solution through a gas dispersion tube and the solution was continuously withdrawn from the chlorination tank, pumped to a settling tank where the precipitate was permitted to settle, and filtered under vacuum. Results obtained in three separate tests at varying flow rates were as follows:

| Test number | Concentration in influent (gms./liter) | | Concentration in effluent (gms./liter) | |
|---|---|---|---|---|
| | Thiosulfate | Silver | Thiosulfate | Silver |
| 1 | 177 | 3.42 | 106 | <0.001 |
| 2 | 168 | 3.38 | 140 | 0.41 |
| 3 | 184 | 3.20 | 128 | 0.002 |

EXAMPLE 6

The thiosulfate fix described in Example 5 was chlorinated with hypochlorite by combining one liter of spent fix with half a liter of 15 weight percent sodium hypochlorite solution to give a mixture with a pH of about 11, a thiosulfate concentration of 120 grams per liter, and a silver concentration of 2.3 grams/liter. Within a few minutes after the spent fix and the hypochlorite solution were mixed together, the thiosulfate concentration was reduced to 50 grams per liter and the silver concentration to 0.74 gram per liter.

As will be apparent from the disclosure and examples presented above, the method of this invention is a practical and economically feasible procedure for treating waste photographic processing solutions which serves the dual purpose of pollution abatement and silver recovery. Unlike many of the chemical precipitation techniques proposed heretofore for recovery of silver from such solutions, the method of this invention produces no noxious by-products, such as hydrogen sulfide. Moreover, the solution remaining after silver recovery can be disposed of by sewering without creating a serious pollution problem in view of the substantial reduction in biological and chemical oxygen demand which is achieved. A further advantage is that in those processing solutions containing hexacyanoferrate ion there will be a reduction in the toxicity which is due to formation of cyanide ion in the waste solution.

The invention has been described in detail with particular reference to preferred embodiments thereof, but it will be understood that variations and modifications can be effected within the spirit and scope of the invention.

We claim:

1. A method of treating a waste photographic processing solution containing silver thiosulfate complex to recover silver therefrom and to reduce the oxygen demand of said solution so as to minimize water pollution resulting from disposal thereof, said method comprising the step of chlorinating said solution under alkaline conditions to destroy thiosulfate ion and to precipitate a silver-bearing sludge from which the silver can be separated.

2. The method as described in claim 1 wherein said chlorination is carried out with said solution at a pH of greater than ten.

3. The method as described in claim 1 wherein said chlorination is carried out with said solution at a pH of about 11.5.

4. The method as described in claim 1 wherein said chlorination is effected by introducing chlorine gas into said solution.

5. The method as described in claim 1 wherein said chlorination is effected by mixing said solution with hypochlorite solution.

6. The method as described in claim 1 wherein said waste photographic processing solution is a mixture of spent thiosulfate fixing solution and spent ferricyanide bleach solution.

7. A method of treating an exhausted thiosulfate fixing solution to recover silver therefrom and to reduce its oxygen demand so as to minimize water pollution resulting from disposal thereof, said method comprising the step of simultaneously introducing both chlorine and sodium hydroxide into said solution to destroy thiosulfate ion and to precipitate a silver-bearing sludge from which the silver can be separated.

References Cited

UNITED STATES PATENTS

| 792,259 | 6/1905 | Grossman | 23—134X |
|---|---|---|---|
| 1,448,475 | 3/1923 | Weisberg | 75—118 |
| 1,545,032 | 7/1925 | Born | 75—118X |
| 2,131,072 | 9/1938 | Reid | 75—118X |
| 2,273,569 | 2/1942 | Goette | 75—105 |
| 2,507,175 | 5/1950 | Pool | 75—108 |
| 3,082,079 | 3/1963 | Bulloch et al. | 75—108 |

FOREIGN PATENTS

| 706,929 | 3/1965 | Canada | 23—115 |
|---|---|---|---|

OTHER REFERENCES

Chem Ab., vol. 44, 5735C.
Chem. Ab., vol. 65, 16298C.

L. DEWAYNE RUTLEDGE, Primary Examiner

G. T. OZAKI, Assistant Examiner

U.S. Cl. X.R.

23—134; 75—83, 118

Disclaimer 3,594,157.—*Thomas N. Hendrickson* and *Thomas J. Dagon*, Rochester, N.Y. ALKALINE CHLORINATION OF WASTE PHOTOGRAPHIC PROCESSING SOLUTIONS CONTAINING SILVER. Patent dated July 20, 1971. Disclaimer filed Oct. 2, 1974, by the assignee, *Eastman Kodak Company*.

Hereby disclaims the entire remaining term of said patent.

[*Official Gazette November 26, 1974.*]